April 24, 1951  J. E. JOHNSON, SR  2,549,817
CLUTCH RELEASE BEARING LUBRICATING DEVICE
Filed March 30, 1945
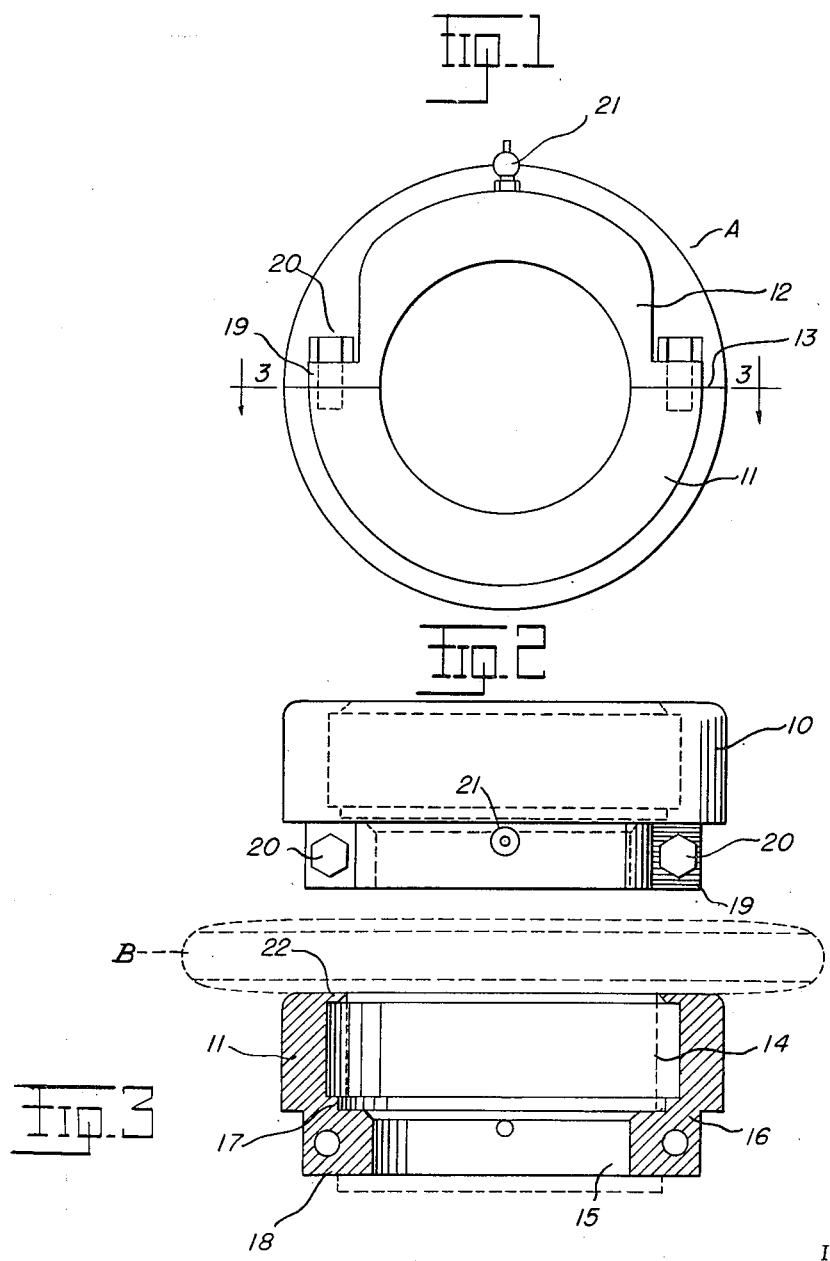
INVENTOR.
JOSEPH ELTON JOHNSON SR.
BY *Victor J. Evans & Co.*
ATTORNEYS Patented Apr. 24, 1951

2,549,817

UNITED STATES PATENT OFFICE 2,549,817

CLUTCH RELEASE BEARING LUBRICATING DEVICE

Joseph E. Johnson, Sr., Houston, Tex.

Application March 30, 1945, Serial No. 585,774

2 Claims. (Cl. 308—233)

The invention relates to a bearing lubricator, and more especially to a clutch release bearing lubricating device.

The primary object of the invention is the provision of a lubricator device of this character, wherein the bearing of a clutch release, as commonly used on Chevrolet automobiles, or other similar bearings, can be properly and successfully lubricated by oiling equipment employed in garages, filling stations or other places, the device being readily and easily assembled or demounted and is novel in construction and unique in its construction.

Another object of the invention is the provision of a device of this character, wherein lubricant can be conveniently supplied thereto for the oiling or greasing of the bearing, and such lubrication will last for a considerable length of time to avoid undue wear on the bearing.

A further object of the invention is the provision of a lubricating device of this character, wherein the latter may be used as a permanent accessory to a clutch or other bearing to save considerable time and labor cost for the lubrication job on a motor vehicle or other equipment, the device being readily accessible for lubricating purposes, and avoids dismantling procedure of the bearing.

A still further object of the invention is the provision of a lubricator device of this character, which is simple in construction, thoroughly reliable and effective in its purpose, strong, durable, possessed of few parts, and inexpensive to manufacture and install.

With these and other objects in view, the invention consists in the features of construction, combination and arrangement of parts as will be hereinafter more fully described, illustrated in the accompanying drawing, which discloses the preferred embodiment of the invention, and pointed out in the claims hereunto appended.

In the accompanying drawings:

Figure 1 is an elevation of the lubricating device constructed in accordance with the invention.

Figure 2 is a top plan view.

Figure 3 is a sectional view taken on the line 3—3 of Figure 1 looking in the direction of the arrows as applied to a release bearing shown in dotted lines.

Similar reference characters indicate corresponding parts throughout the several views in the drawing.

Referring to the drawing in detail, A denotes generally the lubricating device in its entirety constructed in accordance with the invention, and comprises a crosswise split sectional collar-like body member 10, of circular contour, its sections 11 and 12, respectively, at the split 13 in the said member 10 being brought into meeting relation to each other for the closing of the latter about the clutch release bearing B in dotted lines in Figure 3, commonly used in "Chevrolet" motor vehicles.

The open center of the member 10 is formed with large and small bored communicating diameters 14 and 15, respectively, having a stepped shoulder formation 16 therebetween, and in this manner creating internal annular rim flange formations 17 to the said sections 11 and 12, these formations being located at the lower periphery of the large bore 14 and the upper periphery of the small bore 15 or at the point of communication of the large bore 14 with the reduced or small diameter 15, where the said member encircles and embraces a companion external diameter of the clutch release bearing for the coupling of the member with the latter. The large diameter 14 of the member 10 houses the area of such release bearing requiring lubrication.

The body member 10 at the flange formations 17 end is slightly reduced, as at 18 concentrically thereof, and that portion 18 of the section 12 at opposite points is indented to provide bolt receiving ears 19, in which are detachably engaged securing bolts 20 which are tapped into the section 11 confronting these ears for the separable fastening of the sections 11 and 12 together in assembling the body member 10 on the release bearing.

The large bore 14 creates a lubricant receiving pocket formed by the outer surface of the release bearing B, the surface of the bore 14 and the flange formations 17 at the upper periphery of the small bore 15 and communication is had to the latter bore through a check return valved supply nipple 21 so that full lubrication of the release bearing can be had with dispatch and ease through the use of conventional lubricating equipment at garages, filling stations or other places.

When a release bearing of the type previously mentioned is installed in an automobile, it has been previously packed with grease. The bearing is provided with seals to retain the grease packing in the bearing. As the seals wear, the grease will leave the bearing, causing the bearing to wear. Subsequent wear causes the necessity of replacing the bearing.

In use, the device is applied to the release bearing in tight embracing conformity therewith, and grease fed into the large diameter 14 will be forced past the worn seals to repack the bearing. Upon completion of the repacking of the bearing with grease, the device is removed to be used again as required.

In the foregoing manner, through the use of the device A, there is no requirement of disassembling of adjuncts of the clutch release bearing for lubrication of the latter, the latter being carried forth with ease and dispatch, and in this way reducing the cost of such job.

The end of the member 10 having the large diameter 14 is formed with an inwardly directed flange 22, for retaining lubricant within such diameter 14 and retain the grease for the bearing.

What is claimed is:

1. A lubricator of the kind described, comprising a sectional collar-like body member having internal bored large and small diameters and a stepped annular shoulder portion therebetween, for the encircling and embracing a clutch release bearing, and a lubricant supply nipple communicating with the large diameter and accessible without the body member.

2. A lubricator of the kind described, comprising a sectional collar-like body member having internal bored large and small diameters and a stepped annular shoulder portion therebetween, for the encircling and embracing a clutch release bearing, a lubricant supply nipple communicating with the large diameter and accessible without the body member, and means detachably assembling the sections of the body and connecting such sections together about the release bearing.

JOSEPH E. JOHNSON, Sr.

REFERENCES CITED

The following references are of record in the file of this patent:

UNITED STATES PATENTS

| Number | Name | Date |
|---|---|---|
| 1,668,668 | Beemer | May 8, 1928 |
| 2,140,818 | Stein | Dec. 20, 1938 |
| 2,287,631 | Miller | June 23, 1942 |